US011891116B1

(12) United States Patent
Schultz et al.

(10) Patent No.: US 11,891,116 B1
(45) Date of Patent: Feb. 6, 2024

(54) TELESCOPE DRIVE BRACKET

(71) Applicant: Steering Solutions IP Holding Corporation, Saginaw, MI (US)

(72) Inventors: Zachery P. Schultz, Saginaw, MI (US); Raymond J. Neifert, Saginaw, MI (US); Robert D. Maida, Pinconning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/087,954

(22) Filed: Dec. 23, 2022

(51) Int. Cl.
*B62D 1/19* (2006.01)
*B62D 1/185* (2006.01)

(52) U.S. Cl.
CPC ............ *B62D 1/195* (2013.01); *B62D 1/185* (2013.01)

(58) Field of Classification Search
CPC ................................ B62D 1/195; B62D 1/185
See application file for complete search history.

(56) References Cited

U.S. PATENT DOCUMENTS

| 2003/0102658 | A1* | 6/2003 | McCarthy | F16F 7/128 280/777 |
| 2005/0194776 | A1* | 9/2005 | Manwaring | F16F 7/123 280/777 |
| 2007/0194563 | A1* | 8/2007 | Menjak | B62D 1/195 280/777 |
| 2007/0228716 | A1* | 10/2007 | Menjak | B62D 1/192 280/777 |
| 2015/0314801 | A1* | 11/2015 | Gstöhl | B62D 1/189 29/525.05 |

FOREIGN PATENT DOCUMENTS

| DE | 19542491 C1 * | 2/1997 | ............ B62D 1/195 |
| FR | 2801025 A1 * | 5/2001 | ............ B62D 1/195 |
| KR | 100553962 B1 * | 2/2006 | |

* cited by examiner

*Primary Examiner* — Drew J Brown
(74) *Attorney, Agent, or Firm* — Dickinson Wright PLLC

(57) ABSTRACT

A telescope drive bracket for coupling a telescoping actuator to an upper steering jacket, the telescope drive bracket includes a plate including a first end, an opposite second end, and a pair of sides extending from the first end to the second end, a strap retainer formed with the plate and including a reaction wall extending in parallel with the plate, and a strap including a first portion engaging the strap retainer, a second portion extending along the plate, and a bent portion between the first portion and the second portion, the first portion and the second portion extend from the bent portion in a same direction.

20 Claims, 5 Drawing Sheets

TELESCOPE DRIVE BRACKET

TECHNICAL FIELD

The present specification generally relates to a telescope drive bracket for coupling a telescoping actuator to a steering jacket and, more specifically, a telescope drive bracket including an integrated energy absorbing retainer.

BACKGROUND

Telescope drive brackets facilitate attachment of an actuator to a jacket in a steering assembly to permit a steering wheel to be moved toward or away from a driver. However, in the event of a vehicle crash, it is desirable for the steering assembly to collapse at a controlled speed to position the steering wheel a specified distance from the driver. A rigid attachment of the actuator to the jacket of the steering assembly prevents the steering assembly from collapsing until the rigid attachment breaks, causing the steering assembly to collapse uncontrolled. The positioning of the steering wheel too close to the driver causes the driver to collide with the steering wheel when the steering wheel is not far enough away to deploy an airbag. Alternatively, the positioning of the steering wheel too far away from the driver causes the driver to accelerate toward the steering wheel and airbag due to the force of the vehicle crash, which increases the severity of injuries from the crash.

SUMMARY

In a first aspect, a telescope drive bracket for coupling a telescoping actuator to an upper steering jacket, the telescope drive bracket includes a plate including a first end, an opposite second end, and a pair of sides extending from the first end to the second end, a strap retainer formed with the plate and including a reaction wall extending in parallel with the plate, and a strap including a first portion engaging the strap retainer, a second portion extending along the plate, and a bent portion between the first portion and the second portion, the first portion and the second portion extend from the bent portion in a same direction.

In a second aspect, a steering assembly includes an upper steering jacket, and a telescope drive bracket including a plate including a first end, an opposite second end, and a pair of sides extending from the first end to the second end, a strap retainer formed with the plate and including a reaction wall extending in parallel with the plate, and a strap including a first portion engaging the strap retainer, a second portion extending along the plate, and a bent portion between the first portion and the second portion, the first portion and the second portion extend from the bent portion in a same direction, and the second portion is attached to the upper steering jacket.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are used in conjunction with a steering assembly of a vehicle, such as, but not limited to, a car, truck, sport utility vehicle, crossover, mini-van, marine craft, aircraft, all-terrain vehicle, recreational vehicle, or other suitable vehicles, including various steering system schemes.

Figure 1:
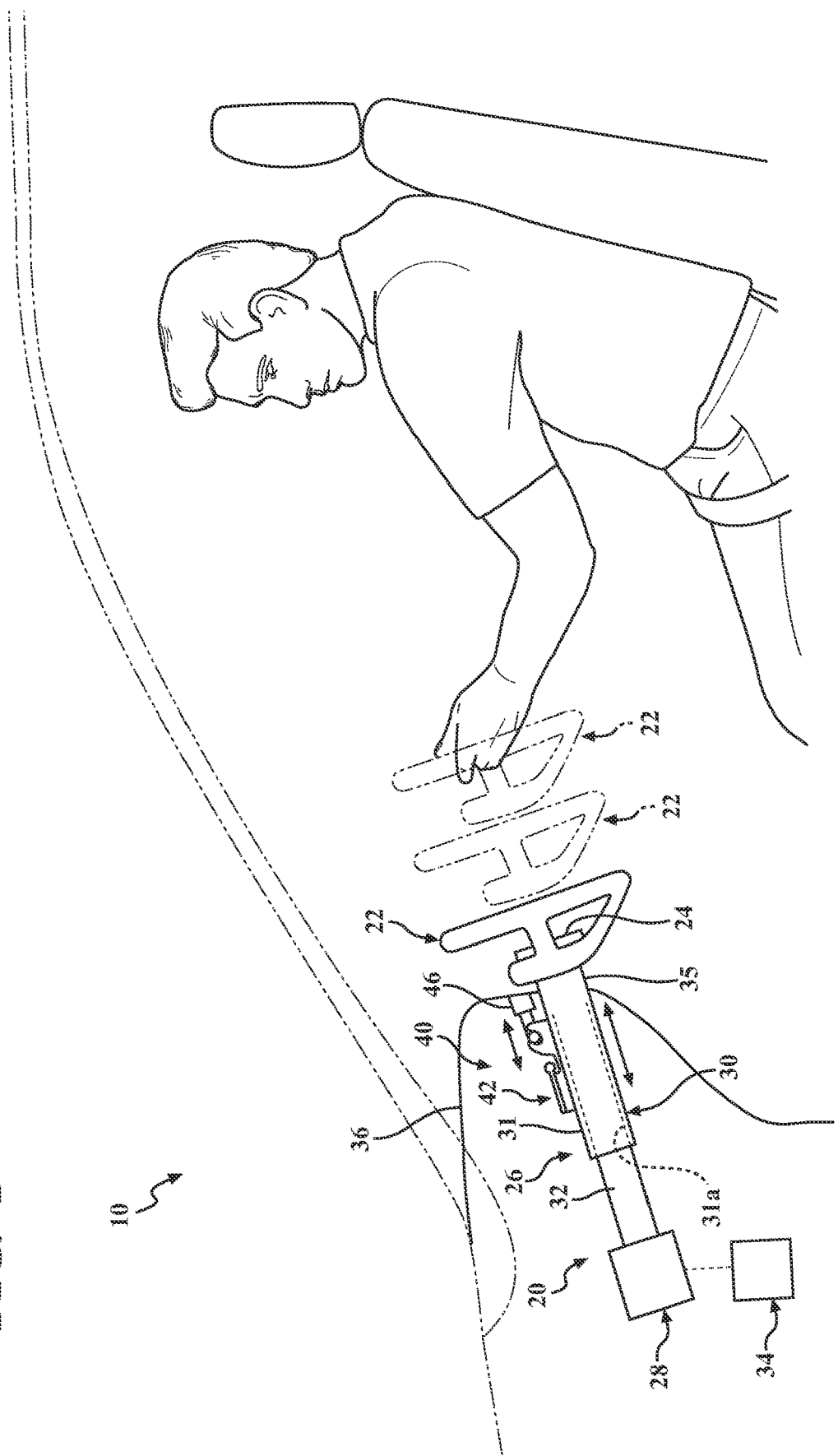
FIG. 1 schematically depicts a side view of a vehicle steering assembly having a telescoping steering wheel, according to one or more embodiments shown and described herein.

Referring initially to FIG. 1, a steering assembly 20 and a telescoping assembly for a vehicle 10 are depicted. The steering assembly 20 may be configured as a driver interface steering system, an autonomous driving system, or a system that allows for both driver interface and autonomous steering. The steering assembly 20 may include an input device 22, such as a steering wheel, wherein a driver may mechanically provide a steering input by turning the steering wheel, an airbag device 24 located on or near the input device 22, and a steering column 26 extending along an axis from the input device 22 to an output assembly 28. The output assembly 28 is mechanically or electrically connected to a rack assembly 34 of the vehicle 10 to operate the rack assembly 34 to steer a pair of wheels (not shown) of the vehicle in response to an input from the input device 22.

The steering column 26 may include at least two axially adjustable parts, for example, a first portion 30 and a second portion 32 that are axially adjustable with respect to one another to move the input device 22 closer or further away from a driver. The first portion may be an upper jacket 30, and the second portion 32 may be a lower jacket 32 that is axially movable relative to the upper jacket 30. The upper jacket 30 may include a hollow cylinder 31 that defines an interior space 31a, and a nodule 33 on an outer surface 35 of the hollow cylinder 31 that extends from the outer surface 35. The interior space 31a of the hollow cylinder 31 may receive the lower jacket 32 to movably couple the lower jacket 32 to the upper jacket 30 and allow the lower jacket 32 to move axially to the upper jacket 30.

The upper jacket 30 may be coupled to the input device 22 to move the input device 22 with the upper jacket 30 relative to the lower jacket 32. The lower jacket 32 may be coupled to the output assembly 28 to restrict axial movement of the lower jacket 32, permitting the upper jacket 30, along with the input device 22, to move relative to the lower jacket 32 and the output assembly 28. The output assembly 28 may be fixed to a vehicle frame (not shown) or other static component to restrict movement of the output assembly 28.

Figure 2:
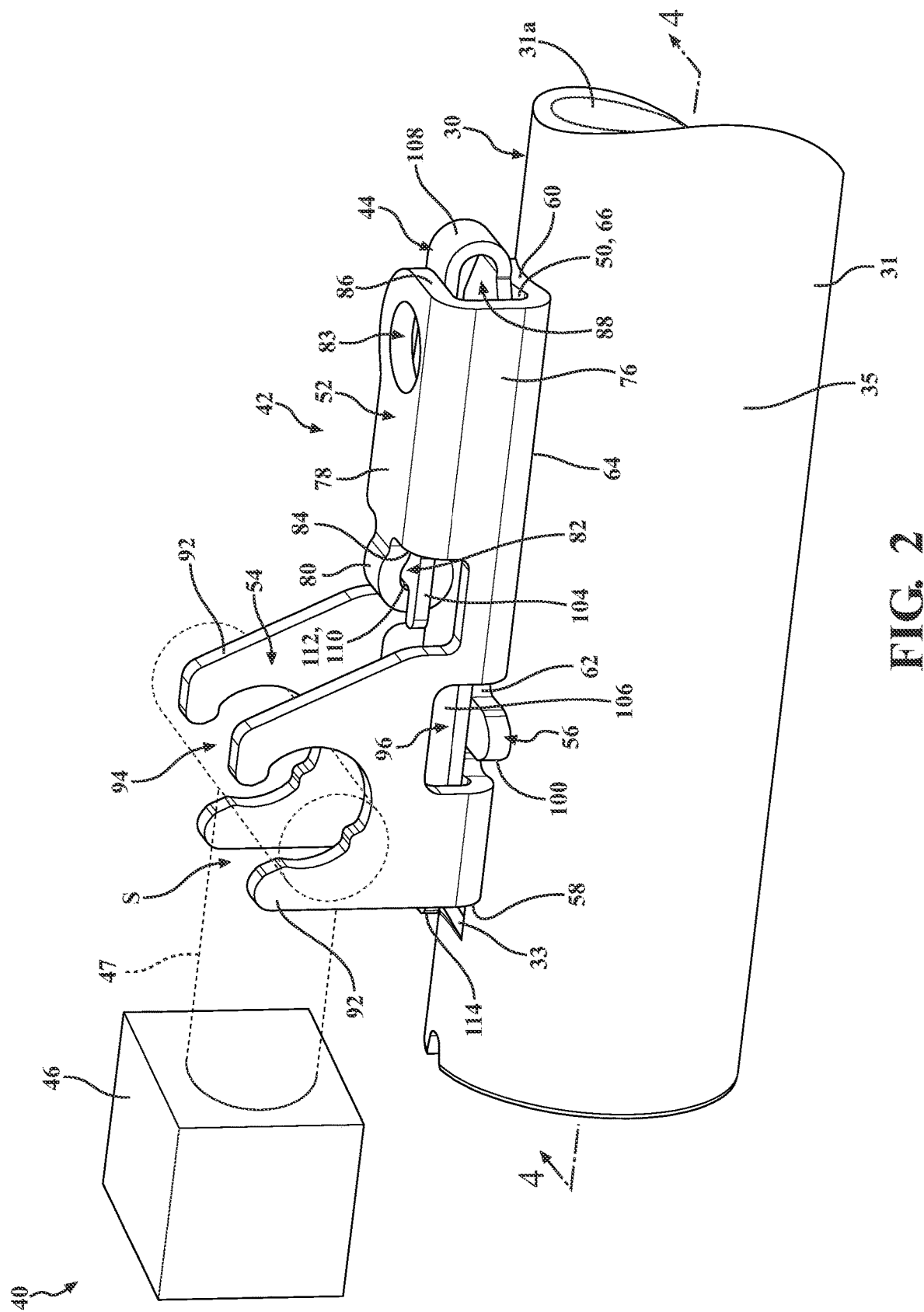
FIG. 2 schematically depicts a side perspective view of the vehicle steering assembly of FIG. 1 including a telescope drive bracket with an energy absorbing strap, according to one or more embodiments shown and described herein.
Figure 3:
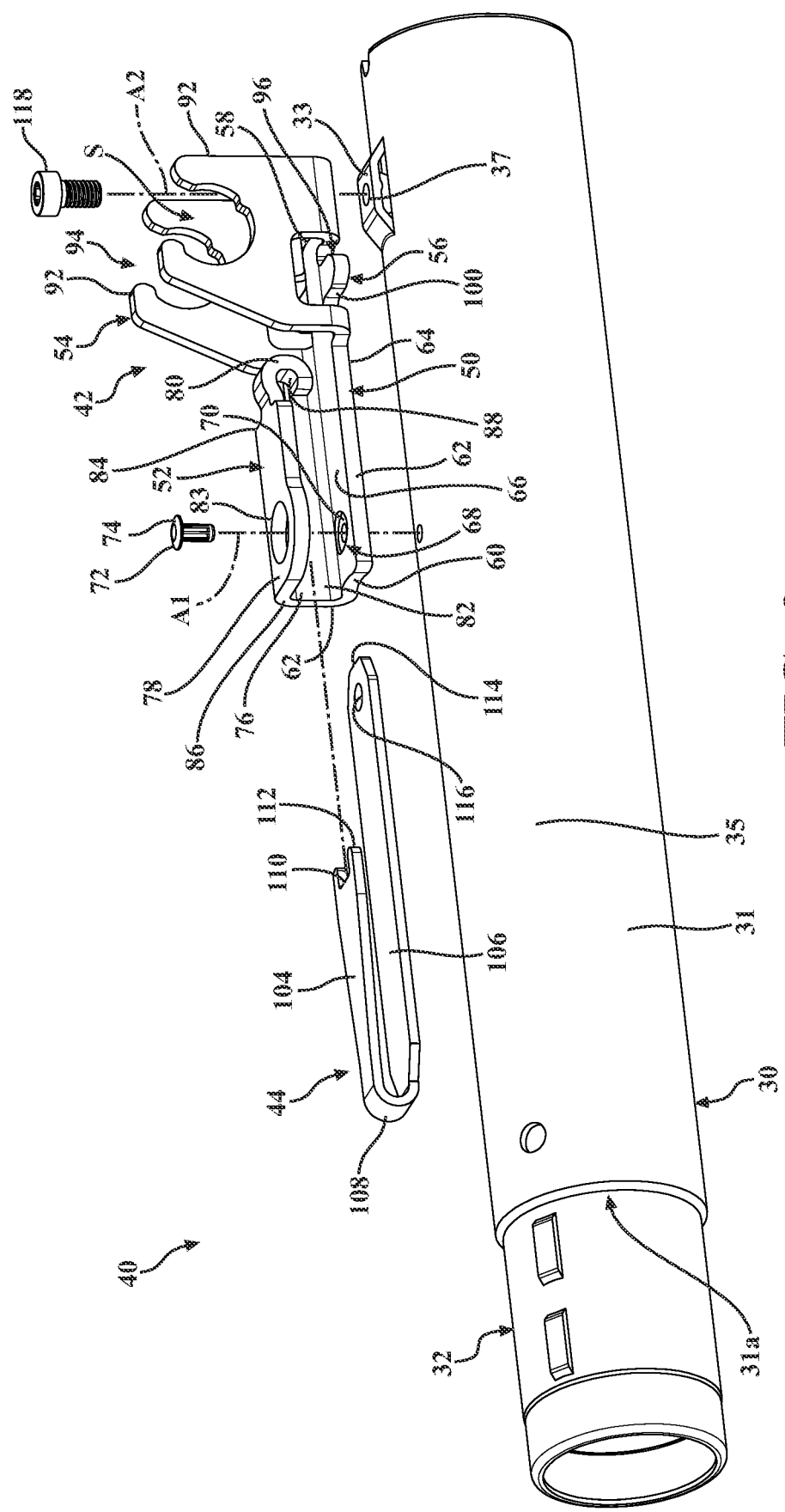
FIG. 3 schematically depicts an exploded view of the vehicle steering assembly of FIG. 2, according to one or more embodiments shown and described herein.

Referring now to FIGS. 1-3, the telescoping assembly 40 may be coupled to the steering assembly 20 to move the upper jacket 30 relative to the lower jacket 32, thereby adjusting a position of the input device 22 relative to the driver. The telescoping assembly 40 may include a telescope drive bracket 42, an energy absorbing strap 44, and a telescoping actuator 46. The telescope drive bracket 42 may be coupled between the upper jacket 30 and the telescoping actuator 46 to transfer movement from the telescoping actuator 46 to the upper jacket 30, thereby moving the upper jacket 30 relative to the lower jacket 32. The telescoping actuator 46 may be fixed to a static vehicle structure, such as a dashboard 36, and coupled to the telescope drive bracket 42 to move the telescope drive bracket 42 and upper jacket 30 relative to the dashboard 36. In some embodiments, the telescoping actuator 46 may be coupled to the lower jacket 32 to move the upper jacket 30 relative to the lower jacket 32 without being coupled to an exterior structure, such as the dashboard 36. As will be described in greater detail below, the energy absorbing strap 44 is coupled between the telescope drive bracket 42 and the upper jacket 30 to absorb energy during a vehicle crash, and control a speed at which the steering column 26 and steering wheel 22 collapses.

Referring to FIGS. 2 and 3, the telescope drive bracket 42 may include a plate 50, a strap retainer 52, an attachment portion 54, and an anti-rotation feature 56. Each of the plate 50, the strap retainer 52, the attachment portion 54, and the anti-rotation feature 56 may be formed as a single, monolithic structure. However, it is contemplated and possible that any combination of the plate 50, the strap retainer 52, the attachment portion 54, and the anti-rotation feature 56 may be formed as a single, monolithic structure, with the remainder of the components being formed separately and attached thereto.

The plate 50 may include a first end 58, an opposite second end 60, a pair of sides 62 extending from the first end 58 to the second end 60, a lower side 64 facing the upper jacket 30, and an upper side 66 facing away from the upper jacket 30. The plate 50 may have a curvature that is complementary to a curvature of the upper jacket 30, such that the plate 50 is arcuate between the pair of sides 62 and the lower side 64 is concave. The plate 50 may define an opening 68 near the second end 60 that defines a step 70 and receives a fastener 72 for coupling the plate 50 to the upper jacket 30. The upper jacket 30 may include an opening 39 (FIG. 4) aligned with the opening 68 in the plate 50 to receive the fastener 72, coupling the plate 50 to the upper jacket 30. The step 70 may be sized to house a head 74 of the fastener 72 so that the head 74 of the fastener 72 is below the upper side 66. The fastener 72 may have a shear strength that is configured to shear upon a predetermined load, such as from a vehicle accident, to decouple the plate 50 from the upper steering jacket 30. The fastener 72 may be, for example, a shear pin. However, it is contemplated and possible that the fastener 72 is any coupling capable of decoupling the telescope drive bracket 42 from the upper jacket 30 in the event of a vehicle crash, such as, but not limited to, welding.

Referring still to FIGS. 2 and 3, the strap retainer 52 may include a side wall 76 extending from one of the sides 62 of the plate 50 away from the upper jacket 30, a reaction wall 78 extending from the side wall 76 in parallel with the upper side 66 of the plate 50, and a retaining member 80 extending from the reaction wall 78. The reaction wall 78 may be spaced apart from the plate 50 to define a first opening 82 at the second end 60 of the plate 50 that is partially enclosed by the plate 50, the side wall 76, and the reaction wall 78. The reaction wall 78 may include an inner end 84 and an opposite outer end 86 adjacent the first opening 82, and the retaining member 80 may extend from the inner end 84 toward the first end 58 of the plate 50. The reaction wall 78 may further define a hole 83 adjacent the second end 60 of the plate that extends through the reaction wall 78 into the space between the reaction wall 78 and the plate 50. The retaining member 80 may be shaped to retain an end of the strap 44, for example, the retaining member 80 may be shaped as a hook that defines a second opening 88 in the space between the retaining member 80 and the plate 50, and that faces, or is open to, the outer end 86 of the reaction wall 78. The hole 83 may be concentric with the opening 68 about an axis A1 to receive the fastener 72 that couples the plate 50 to the upper jacket 30.

The attachment portion 54 may be positioned near the first end 58 of the plate between the strap retainer 52 and the first end 58. The attachment portion 54 is rigidly attached to the telescoping drive actuator 46 to move with the upper jacket 30 when the telescoping drive actuator 46 actuates. The attachment portion 54 may include a pair of tabs 92 that extend from the upper side 66 and each of the sides 62 of the plate 50. The pair of tabs 92 are spaced apart a width of the plate 50 to define a space S therebetween. Each tab 92 of the attachment portion 54 defines an attachment opening 94 for receiving and coupling to a telescoping member 47 of the telescoping drive actuator 46. The telescoping member 47 is extendable and retractable from the telescoping drive actuator 46, such that actuation of the telescoping drive actuator 46 extends and retracts the telescoping member 47 and the plate 50 via the attachment portion 54. Each tab 92 may further define a lower opening 96 positioned at the sides 62 of the plate 50 to allow the anti-rotation feature 56 to extend therethrough to extend from the sides 62 of the plate 50.

The anti-rotation feature 56 may include a pair of lateral tabs 100 extending from the sides 62 of the plate 50 through the lower opening 96 in the tabs 92 of the attachment portion 54. The anti-rotation feature 56 extend outwardly of the plate 50 contacting the outer surface 35 of the upper jacket 30 and preventing the telescope drive bracket 42 from rotating relative to the upper jacket 30.

Figure 4:
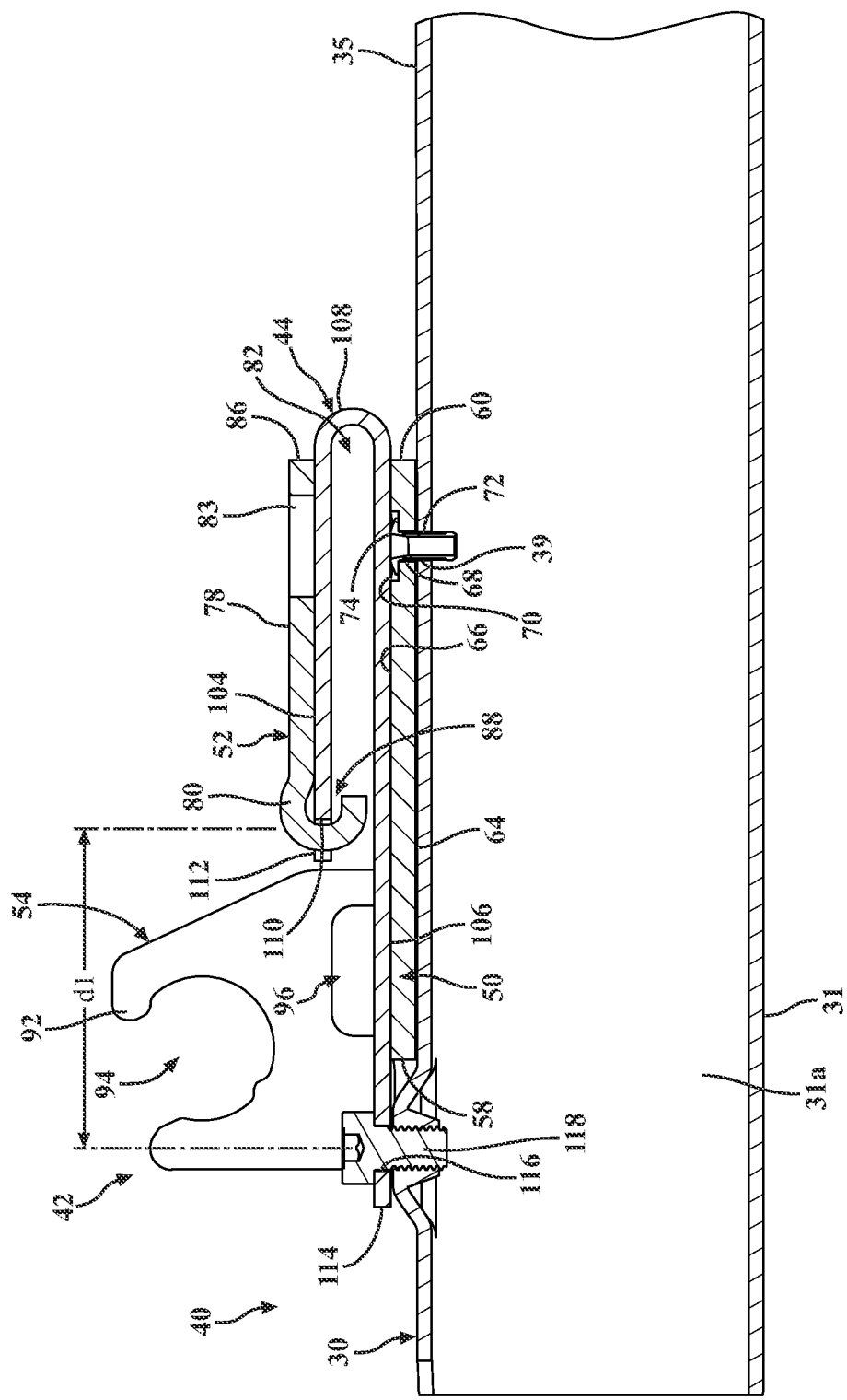
FIG. 4 schematically depicts a cross-sectional side view of the vehicle steering assembly of FIG. 2 taken along line 4-4, the vehicle steering assembly shown in an undisplaced state, according to one or more embodiments shown and described herein.

Referring to FIGS. 2-4, the strap 44 may be coupled between the telescoping drive bracket 42 and the upper jacket 30 to absorb energy of the collapse of the steering column 26 in the event of a vehicle crash. The strap 44 may include a first portion 104, a second portion 106, and a bend 108 positioned between the first portion 104 and the second portion 106, where the bend 108 redirects the extension of the strap 44 from the first portion 104 to the second portion 106. The first portion 104 of the strap 44 extends from the retaining member 80 along the reaction wall 78 of the strap retainer 52 to be in contact with the reaction wall 78. The second portion 106 extends from the bend 108 along the plate 50 to be in contact with the upper side 66 of the plate 50. The first portion 104 may extend in parallel with the second portion 106 to extend in a same direction. The direction that the first portion 104 and the second portion 106 extend may be a direction of extension of the plate 50 or, in other words, a direction extending through the first end 58 and the second end 60 of the plate 50. The strap 44 may define a notch 110 at a first end 112 at the first portion 104, the notch 110 being engaged with the retaining member 80 of the strap retainer 52 to retain the first end 112 of the strap 44 in contact with the retaining member 80 and the strap retainer 52.

The strap 44 may include a second end 114 opposite the first end 112 that is coupled to the upper jacket 30. The strap 44 may define a fastener opening 116 near the second end 114 that is concentric with an opening 37 in the nodule 33 of the upper jacket 30 about an axis A2 to receive a rigid fastener 118 that rigidly couples the strap 44 to the upper jacket 30. The rigid fastener 118 couples the strap 44 to the upper jacket 30 to retain attachment between the strap 44 and the upper jacket 30 in the event of a vehicle accident. The rigid fastener 118 may have a shear strength that is greater than the shear strength of the fastener 72 such that the rigid fastener 118 does not shear upon receiving the predetermined load. The rigid fastener 118 maintains the coupling between the second end 114 of the strap 44 during a vehicle accident, while the other fastener 72 shears, allowing the second end 114 of the strap 44 and the upper jacket 30 to move relative to the telescope drive bracket 42. As will be described in greater detail below, the telescope drive bracket 42 remains coupled to the telescoping actuator 46 while the upper jacket 30 separates and moves away from the telescope drive bracket 42, unfurling the strap 44 between the plate 50 and the reaction wall 78.

The strap 44 may be formed of an elongated metal sheet that is bent and inserted between the strap retainer 52 and the plate 50, where the telescope drive bracket 42 retaining the strap 44 in a bent configuration creates a biasing force against the telescope drive bracket 42 as the bent strap 44 attempts to unfold to return to the initial state of the metal sheet. The biasing force from the bent strap 44 biases the first portion 104 of the strap 44 into the reaction wall 78 and the second portion 106 into the upper side 66 of the plate 50.

Figure 5:
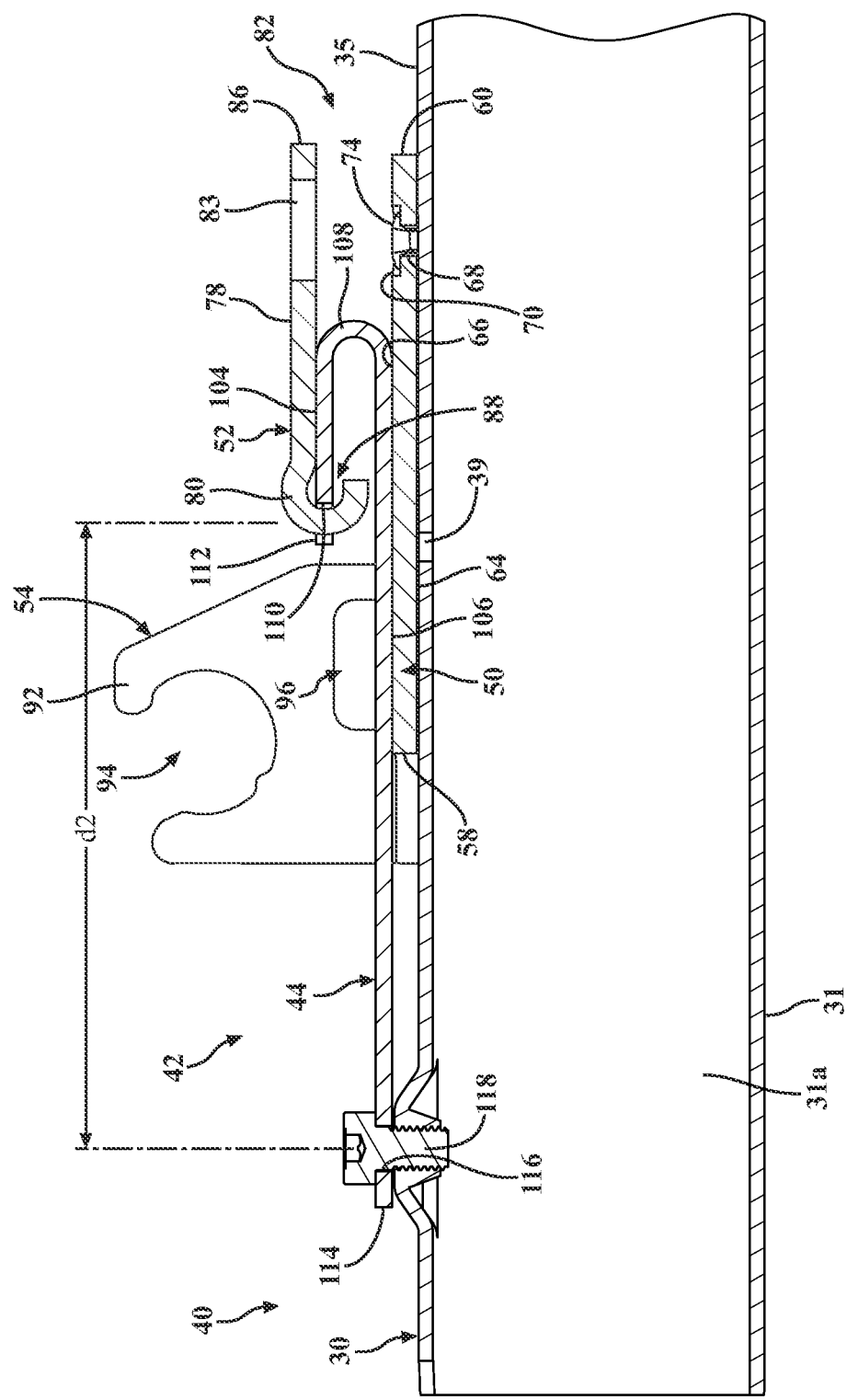
FIG. 5 schematically depicts a cross-sectional side view of the vehicle steering assembly of FIG. 2 taken along line 4-4, the vehicle steering assembly shown in a displaced state, according to one or more embodiments shown and described herein.

Referring now to FIGS. 4 and 5, the telescoping assembly 40 may transition from an undisplaced state (FIG. 4) to a displaced state (FIG. 5). Referring to FIG. 4, in the undisplaced state, the fastener 72 is intact, coupling the telescope drive bracket 42 to the upper jacket 30. In the undisplaced state, the strap 44 is in an initial position with the bend 108 extending through the first opening 82 to at least partially extend past the second end 60 of the plate 50, and the retaining member 80 and the first end 112 of the strap 44 is a first distance d1 away from the fastener 118. In the undisplaced state, the telescope drive bracket 42 connects the telescoping actuator 46 to the upper jacket 30 to permit the telescoping actuator 46 to adjust the position of the upper jacket 30 along with the input device 22. When a vehicle accident occurs, the accident may place a force on the telescoping assembly 40. If the force is greater than the predetermined load, the fastener 72 shears to uncouple the telescope drive bracket 42 from the upper jacket 30. The telescope drive bracket 42 is substantially retained in the same position by the connection to the telescoping actuator 46. The upper jacket 30, due to the force from the accident and other forces (such as from gravity, a motor, or the like) retracts toward the output assembly 28 and away from the telescope drive bracket 42 to the displaced state. The upper jacket 30 is retracted to retract the input device 22 away from the driver to prevent collision between the driver and the input device 22 during the accident.

Referring to FIG. 5, in the displaced state, the telescope drive bracket 42 is moved relative to the nodule 33 of the upper jacket 30 that the second end 144 of the strap 44 is attached to, and the retaining member 80 and the first end 112 of the strap 44 is a second distance d2 away from the fastener 118, the second distance d2 being greater than the first distance d1. The movement of the telescope drive bracket 42 relative to the upper jacket 30 causes the strap 44 to unfurl between the reaction wall 78 and the upper side 66 of the plate 50. The unfurling of the strap 44 further increases the biasing force from the bent strap 44 against the reaction wall 78 and the plate 50 while the strap 44 moves across the plate 50. The increased biasing force increases a normal force between the strap 44 and the telescope drive bracket 42 that increases a frictional force between the strap 44 and the plate 50 as the strap 44 moves across the plate 50 between the undisplaced state (FIG. 4) and the displaced state. The increased forces from the unfurling and movement of the strap 44 slow the movement of the upper jacket 30 relative to the telescope drive bracket 42, reducing the speed that the input device 22 retracts away from the driver. This positions the input device 22, along with the airbag device 24, a desired distance away from the driver when the airbag device 24 is deployed, thereby reducing injury to the driver.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A telescope drive bracket for coupling a telescoping actuator to an upper steering jacket, the telescope drive bracket comprising:
   a plate comprising a first end, an opposite second end, and a pair of sides extending from the first end to the second end;
   a strap retainer formed with the plate and comprising a reaction wall extending in parallel with the plate; and
   a strap comprising a first portion engaging the strap retainer, a second portion extending along the plate, and a bent portion between the first portion and the second portion, the first portion and the second portion extend from the bent portion in a same direction.

2. The telescope drive bracket of claim 1, wherein the telescope drive bracket is configured to be attached to the upper steering jacket, the plate having a curvature complementary to a curvature of the upper steering jacket.

3. The telescope drive bracket of claim 1, further comprising an anti-rotation feature comprising a pair of tabs extending from the sides of the plate that are configured to prevent the telescope drive bracket from rotating relative to the upper steering jacket.

4. The telescope drive bracket of claim 1, further comprising an attachment portion coupled to the plate at the first end, and comprising a pair of tabs extending from the pair of sides of the plate and each tab defining an opening for receiving and coupling to the telescoping actuator.

5. The telescope drive bracket of claim 1, wherein the strap retainer further comprises a side wall extending from one of the sides of the plate, the reaction wall is coupled to the side wall and is spaced apart from the plate to define an opening at the second end of the plate, and the bent portion of the strap extends through the opening.

6. The telescope drive bracket of claim 1, wherein the strap retainer further comprises a hook extending from the reaction wall that an end of the strap is engaged with.

7. The telescope drive bracket of claim 6, wherein the strap defines a notch at the end of the strap that receives the hook of the strap retainer to engage the strap with the strap retainer.

8. The telescope drive bracket of claim 1, wherein the strap is made of steel.

9. The telescope drive bracket of claim 1, wherein the telescoping actuator adapted for moving the upper steering jacket along a steering axis to move a steering wheel toward or away from a driver.

10. A steering assembly comprising:
an upper steering jacket; and
a telescope drive bracket comprising:
  a plate comprising a first end, an opposite second end, and a pair of sides extending from the first end to the second end;
  a strap retainer formed with the plate and comprising a reaction wall extending in parallel with the plate; and
  a strap comprising a first portion engaging the strap retainer, a second portion extending along the plate, and a bent portion between the first portion and the second portion, the first portion and the second portion extend from the bent portion in a same direction, and the second portion is attached to the upper steering jacket.

11. The telescope drive bracket of claim 10, further comprising a telescoping actuator coupled to an attachment portion of the telescope drive bracket, and adapted for moving the upper steering jacket along a steering axis.

12. The telescope drive bracket of claim 11, further comprising an attachment portion coupled to the plate at the first end, and comprising a pair of tabs extending from the pair of sides of the plate and each tab defining an opening for receiving and coupling to the telescoping actuator.

13. The telescope drive bracket of claim 10, wherein the strap is rigidly coupled to the upper steering jacket, and the plate is coupled to the upper steering jacket by a shear pin such that, when a predetermined load is placed on the steering assembly, the shear pin decouples the plate from the upper steering jacket and the strap remains coupled to the upper steering jacket.

14. The telescope drive bracket of claim 10, wherein the upper steering jacket comprises a hollow cylinder configured to receive a lower steering jacket, and a nodule that the second end of the strap is coupled to.

15. The telescope drive bracket of claim 10, wherein the plate has a curvature complementary to a curvature of the upper steering jacket.

16. The telescope drive bracket of claim 10, further comprising an anti-rotation feature comprising a pair of tabs extending from the sides of the plate that are configured to prevent the telescope drive bracket from rotating relative to the upper steering jacket.

17. The telescope drive bracket of claim 10, wherein the strap retainer further comprises a side wall extending from one of the sides of the plate, the reaction wall is coupled to the side wall and is spaced apart from the plate to define an opening at the second end of the plate, and the bent portion of the strap extends through the opening.

18. The telescope drive bracket of claim 10, wherein the strap retainer further comprises a hook extending from the reaction wall that an end of the strap is engaged with.

19. The telescope drive bracket of claim 18, wherein the strap defines a notch at the end of the strap that receives the hook of the strap retainer to engage the strap with the strap retainer.

20. The telescope drive bracket of claim 10, wherein the strap is made of steel.

\* \* \* \* \*